United States Patent
Laprise et al.

(10) Patent No.: US 12,193,604 B2
(45) Date of Patent: Jan. 14, 2025

(54) ACCESSORY PLATE FOR COOKING AU GRATIN IN A BARBECUE

(71) Applicants: Philippe Laprise, Chambly (CA); David-Thomas White, Chambly (CA)

(72) Inventors: Philippe Laprise, Chambly (CA); David-Thomas White, Chambly (CA)

(*) Notice: Subject to any disclaimer, the term of this patent is extended or adjusted under 35 U.S.C. 154(b) by 448 days.

(21) Appl. No.: 17/548,059

(22) Filed: Dec. 10, 2021

(65) Prior Publication Data
US 2022/0183503 A1 Jun. 16, 2022

Related U.S. Application Data

(60) Provisional application No. 63/124,242, filed on Dec. 11, 2020.

(51) Int. Cl.
*A47J 37/07* (2006.01)

(52) U.S. Cl.
CPC ........ *A47J 37/0786* (2013.01); *A47J 37/0704* (2013.01)

(58) Field of Classification Search
CPC .......................... A47J 37/0786; A47J 37/0704
USPC ......................................................... 126/25 R
See application file for complete search history.

(56) References Cited

U.S. PATENT DOCUMENTS

| | | | | |
|---|---|---|---|---|
| 710,786 A | * | 10/1902 | Leland | A47J 37/0704 99/446 |
| 3,320,942 A | * | 5/1967 | Christensen | A47J 37/0704 126/25 C |
| 3,712,285 A | * | 1/1973 | Copeland | A47J 37/0786 126/274 |
| 3,786,741 A | * | 1/1974 | Plumley | A47J 37/0786 99/450 |
| 5,983,786 A | * | 11/1999 | Brown | A47J 37/0786 99/426 |
| 6,038,965 A | * | 3/2000 | Thorndyke | A47J 37/0786 99/449 |
| 2005/0263010 A1 | * | 12/2005 | Fincher | A47J 37/0786 99/422 |
| 2013/0025580 A1 | * | 1/2013 | Barber | F24C 7/06 126/14 |
| 2013/0247898 A1 | * | 9/2013 | Balcerzak | A47J 37/0786 126/25 R |
| 2019/0128538 A1 | * | 5/2019 | Dahle | F24C 15/28 |
| 2021/0169272 A1 | * | 6/2021 | Gehring | A47J 37/0704 |

FOREIGN PATENT DOCUMENTS

| | | | | |
|---|---|---|---|---|
| DE | 202014004450 U1 | * | 10/2014 | ............ A47J 37/067 |
| DE | 202020004172 U1 | * | 11/2020 | |
| WO | WO-2014051206 A1 | * | 4/2014 | ............ A47J 37/06 |

* cited by examiner

*Primary Examiner* — Jorge A Pereiro
*Assistant Examiner* — Logan P Jones
(74) *Attorney, Agent, or Firm* — PRAXIS

(57) ABSTRACT

An accessory plate, positionable onto an accessory support of a barbecue grill and located above a main cooking grill of the barbecue grill, includes a plate member for mounting on the accessory support. The plate member has top and bottom surfaces, and the bottom surface is adapted to face the main cooking grill. The plate defines generally opposite first and second ends; and a center-of-gravity positioning member locating a center of gravity of the accessory adjacent the first end and/or above an upper grill.

18 Claims, 3 Drawing Sheets

ACCESSORY PLATE FOR COOKING AU GRATIN IN A BARBECUE

CROSS-REFERENCE TO RELATED APPLICATIONS

The present application claims the benefit of U.S. provisional patent application No. 63/124,242, filed on Dec. 11, 2020, and which is incorporated herein by reference.

FIELD OF THE INVENTION

The present invention relates to barbecue grills, and more specifically to an accessory plate for allowing cooking au gratin of food stuff in a conventional outdoor gas barbecue grill having a hinged cover, especially the type usually found in North America.

BACKGROUND OF THE INVENTION

It is well known in the art of outdoor barbecue grills to cook different types food, and more specifically to use different accessories to improve the cooking of different types of food, such as special plates for receiving fish or seafood thereon, liquid collecting plates, rotating devices for roasting food, or even articles transforming a grill into an oven-like cooking appliance. Some complex and/or expensive apparatuses enable a person to cook au gratin (as in the French expression meaning to broil a cheese-topped dish) foodstuff using a separate heat device positioned above the food. The later typically requires the second, and usually smaller, cooking grill to be removed, when this second grill is present, as is the case for most barbecue grills. In other cases, the grill itself is made to only perform such 'au gratin' type of cooking.

None of the above accessories, while being simple of manufacture and/or use, allow a person to enable cooking au gratin, gratinating, browning or broiling food, especially cheese-topped food, without overcooking the food itself, such as pizzas, lasagnas, nachos, in a manner similar to using a broil heating element of a conventional kitchen oven appliance.

Accordingly, there is a need for an improved accessory for cooking au gratin for use with an outdoor barbecue grill.

SUMMARY OF THE INVENTION

It is therefore a general object of the present invention to provide an improved accessory for cooking au gratin for use with an outdoor barbecue grill.

An advantage of the present invention is that the accessory provides for a cooking au gratin of different dishes or foodstuffs into conventional gas barbecue grills found in households, usually on patios or the like.

A further advantage of the present invention is that the accessory is relatively light and simple in manufacturing, but heavy enough to remain in place (and not easily fall off), keep/store heat typically received from a roast burner, and prevent warping of the accessory over a wide temperature range usually reached in barbecue grills. A bottom surface of the accessory generally facing the foodstuff to be cooked au gratin is adapted to reflect and radiate stored heat toward the foodstuff, especially cheese-topped food such as pizzas, lasagnas, nachos, etc.

Yet a further advantage of the present invention is that the accessory can easily be installed in place into and removed from a gas barbecue grill having an accessory support, such as an upper grill or any other support, positioned above a main grill and a roast burner usually positioned there between. Although the roast burner is typically provided to roast a foodstuff slowly rotating above the main grill, in the present invention, it is used to heat-up the accessory plate positioned just above the foodstuff to reflect/concentrate the heat from the roast burner and heat-up and quickly cook the top surface of the food stuff.

Another advantage of the present invention is that the accessory is provided with a center-of-gravity positioning member, such as a weight, to ensure that the center of gravity of the accessory remains in proximity to the distal end (far from the user located in front of the opening of the barbecue grill), and typically over the second or upper grill, to prevent displacement of the hot accessory when the barbecue grill cover is opened and closed for the cooking au gratin of different dishes or foodstuffs into conventional gas barbecue grills found in typical North-American households, usually on patios or the like. In addition, the accessory plate does not require any additional support member, other than the plate itself laying on the upper grill.

Yet another advantage of the present invention is that the accessory may include a gripping handle or the like for easy handling, and/or an anchoring member, usually provided adjacent a distal end of the accessory (when inserted in place into a barbecue grill by a user), to prevent any undesired/accidental sliding in at least one horizontal direction, preferably in a direction toward a user, and/or in any or all horizontal directions, when in place onto the upper grill. Also, the accessory may include a deflected section adjacent a proximal end thereof to increase the efficiency of the accessory and/or allow the closing of the barbecue hinged cover when the accessory is in place inside the barbecue grill.

Another advantage of the present invention is that the accessory is made out of a food-grade material, such as proper stainless steel alloys, aluminum alloys, etc.

Yet a further advantage the present invention is that the accessory may include rigidity reinforcing elements, such as longitudinal channels and bosses and/or edge side flaps (typically machined, or even folded), to prevent warping or distortion of the accessory under large temperature excursions.

According to an aspect of the present invention, there is provided an accessory positionable onto an accessory support of a barbecue grill being located above a main cooking grill of the barbecue grill, said accessory comprising:

a plate member for mounting on the accessory support and having top and bottom surfaces, the bottom surface being adapted to face the main cooking grill, the plate defining generally opposite first and second ends; and a center-of-gravity positioning member locating a center of gravity of the accessory adjacent the first end.

In one embodiment, the center-of-gravity positioning member includes a weight member located adjacent the first end.

In one embodiment, the accessory further includes a deflector section located adjacent the second end, the deflector section extending from the plate member in a first direction away from the bottom surface and opposite the top surface.

Conveniently, the deflector section further extends from the bottom surface of the plate member in a second direction away from the first end.

Alternatively, the deflector section is the second end extending at least partially in the first direction at a deflection angle relative to a bottom plane defined by the bottom surface.

Conveniently, the deflection angle is typically less than about 60 degrees, and preferably less than about 45 degrees, relative to the bottom plane.

In one embodiment, the deflector section includes at least one side flap extending in the first direction from a side edge thereof.

In one embodiment, the accessory further includes an anchoring member adapted to securely and releasably engage at least a portion of the accessory support to prevent horizontal displacement of the accessory at least in a direction toward a user of the barbecue grill.

Conveniently, the anchoring member includes a tab member extending away from the bottom surface opposite the top surface along at least a portion of an edge defining the first end.

In one embodiment, the accessory further includes a handle member.

In one embodiment, the bottom surface is generally planar.

In one embodiment, the plate member is a solid plate of generally uniform thickness.

Conveniently, the uniform thickness varies between about ⅛ and about ⅜ of an inch (about 3 and about 10 mm).

In one embodiment, the weight member is an elongated bar secured onto the top surface adjacent the first end.

Conveniently, the elongated bar is positioned along a first edge of the plate member defining the first end thereof.

Alternatively, the elongated bar has a generally uniform trapezoidal, typically rectangular, and preferably square cross-section with a side laying on the top surface.

In one embodiment, the accessory further includes at least one flap extending from an edge of at least one of the plate member and the deflector section, in a direction generally away from a corresponding one of the top and bottom surfaces.

In one embodiment, the plate member includes at least one of a longitudinal boss and a longitudinal channel formed therein and extending in a direction generally parallel to the first and second ends, and there between.

In one embodiment, the elongated bar has a generally uniform semi-circular cross-section defining a generally rectilinear side laying on the top surface.

Conveniently, the elongated bar has a generally solid cross-section.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE INVENTION

Figure 1:
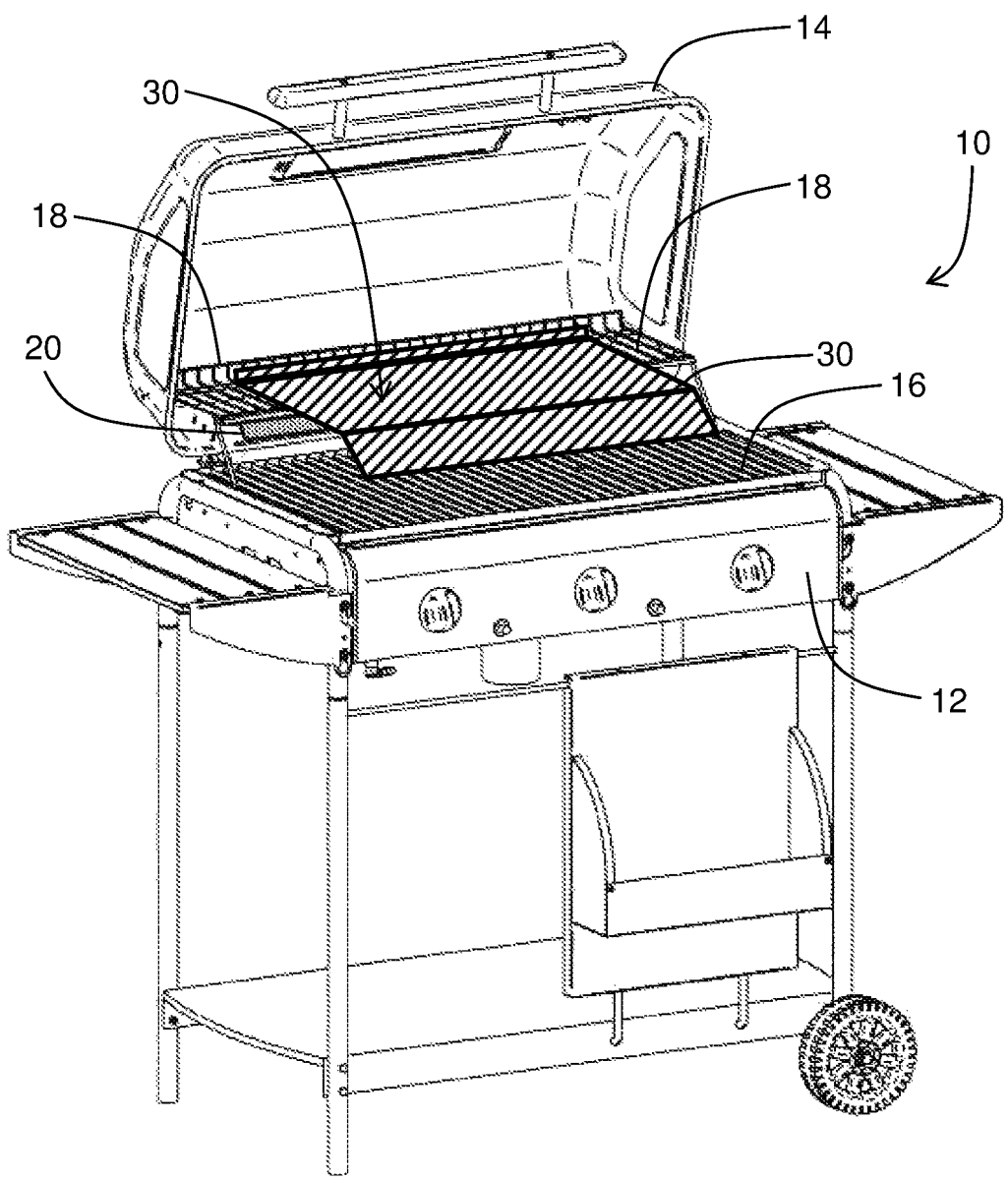
FIG. 1 is an open top left perspective view of a conventional gas barbecue grill, with a schematic accessory in accordance with the present invention installed therein onto the upper grill of the barbecue grill.

In FIG. 1, there is shown a conventional outdoor (or patio) gas barbecue grill 10 having a main body 12 with the hinged top cover 14 opened. Inside most of the barbecue grill 10, there is shown the main cooking grill 16, or lower grill, and usually a second auxiliary grill 18, or upper grill, that is generally smaller than the main grill 16 and positioned in the rear (or distal) section of the barbecue grill 10, obviously above and spaced from the main grill 16. The upper grill 18 does not usually extend up to the front, especially because of the shape of the cover 14 that typically has a rounded or truncated section.

Optionally, at the backwall of the barbecue grill 10, there in a secondary (or roast, or rotisserie, or simply back) burner 20 adapted to slowly and directly cook a rotating foodstuff mounted on a rotisserie support (not shown), usually with the removal of the upper grill 18.

Figure 2:
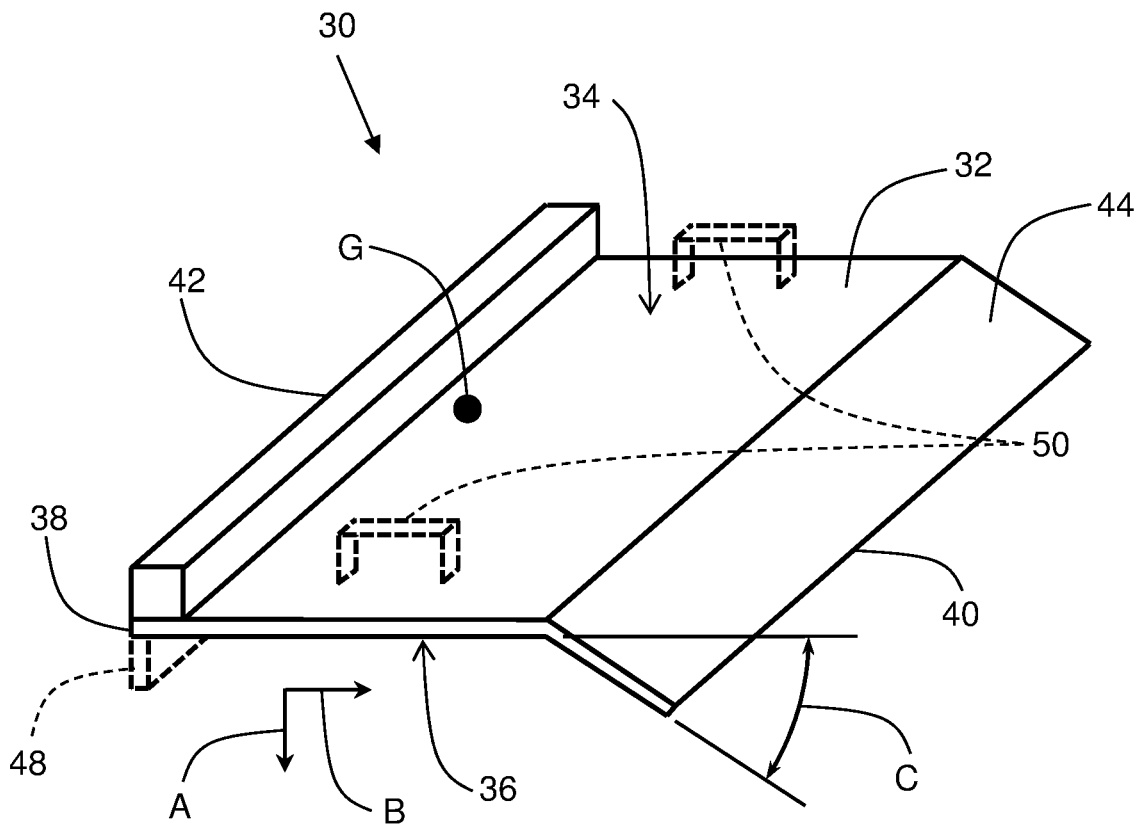
FIG. 2 is a top left perspective view of an embodiment of an accessory in accordance with the present invention.

In FIG. 2, there is shown an embodiment of an accessory 30 in accordance with the present invention for use with a gas barbecue grill 10. The embodiment 30, typically a barbecue accessory plate, is positionable onto an accessory support, typically an upper grill 18 (or any other support, either built-in the accessory, such as legs, or being a separate piece (not shown)) of a barbecue grill 10, above the main cooking grill 16 thereof, as also schematically illustrated in FIG. 1 for illustrative purposes. The accessory 30 comprises plate member 32 that mounts or lays down on the accessory support 18, and that has top 34 and bottom 36 surfaces. The bottom surface 36 is adapted to face the main cooking grill 16. The plate 30 defines generally opposite first 38 and second 40 ends thereof. These first 38 and second 40 ends are also referred to as distal and proximal ends, respectively, for the point of view of a person using the barbecue grill 10. The accessory 30 also includes a center-of-gravity positioning member 42, preferably a weight member 42 or a locally increased plate member 32 thickness or any other physical characteristics of the plate 30, used to essentially locate a center of gravity G of the accessory 30 located above the upper grill 18 and/or adjacent the first end 38.

In this embodiment 30, the accessory typically includes a deflector section 44 (also acting as a plate rigidity member) located adjacent the second end 40. The deflector section 44 extends from the plate member 32 in a first direction A away from the bottom surface 36 and opposite the top surface 34. The deflector section 44 preferably further extends from the bottom surface 36 of the plate member 32 in a second direction B away from the first end 38.

In other words, the deflector section 44 is preferably the second end 40 extending at least partially in the first direction A at a deflection angle C relative to a bottom plane defined by the bottom surface 36. The deflection angle C is typically less than about 60 degrees, and preferably about 45 degrees relative to the bottom plane.

Optionally, the accessory 30 further includes an anchoring member 48 (shown in stippled lines in FIGS. 2 and 3) adapted to securely and releasably engage at least a portion of the accessory support, or upper grill 18 to prevent horizontal displacement of the accessory at least in the second direction B toward a user of the barbecue grill 10. Such an accidental displacement of the plate 30 in direction B could end up to be harmful to the user, especially if the plate 30 is extremely hot.

The anchoring member 48 could typically include a rigid tab extending away from the bottom surface 36 opposite the top surface 34, i.e. in first direction A, along at least a portion of an edge defining the first end 38. In FIG. 2, the rigid tab 48, also acting as plate rigidity member, is shown as extending all along the edge of the first end 38, while in FIG. 3, the tab 48', or a plurality thereof, extends only partially along that edge. In the present case, the anchoring tab 48, 48' is adapted to depend downwardly behind the back edge of the upper grill 18 to prevent any forward displacement thereof. Obviously, depending on the shape of the accessory support 18 (such as in FIG. 1 where the back edge of the upper grill has an upwardly extending side member), the anchoring member 48 could be of multiple shapes and sizes to properly anchor to the support 18. The weight member 42 and the tab 48 also act as a reinforcement member (or plate rigidity member) to increase the rigidity of the plate 30 to prevent any warping or distortion of the plate 30 under large temperature variations seen by the plate 30 in the grill 10.

The weight member 42 further helps in preventing displacement of the plate 30 onto the accessory support 18. In fact, the weight member is typically an elongated bar 42 that allows for the plate 30 to remain in place on the upper grille 18, thereby ensuring it will not accidentally fall down on a user when the barbecue grill cover 14 is opened.

Typically, the weight member is an elongated bar 42 secured onto the top surface 34 adjacent the first end 38, to act as a counterweight to the second end 40 of the plate member 32 that is usually not directly supported (in a cantilever configuration).

As illustrated, the elongated bar 42 is positioned along the edge of the plate member 32 defined along the first end 38, and has a generally uniform trapezoidal cross-section with a side laying on the top surface 34. The cross-section is typically rectangular, and preferably square in shape. That cross-section could be solid (as shown in FIGS. 2 and 3) or hollowed (not shown) depending on the material and the sized thereof, in order to have a predetermined overall weight.

Figure 3:
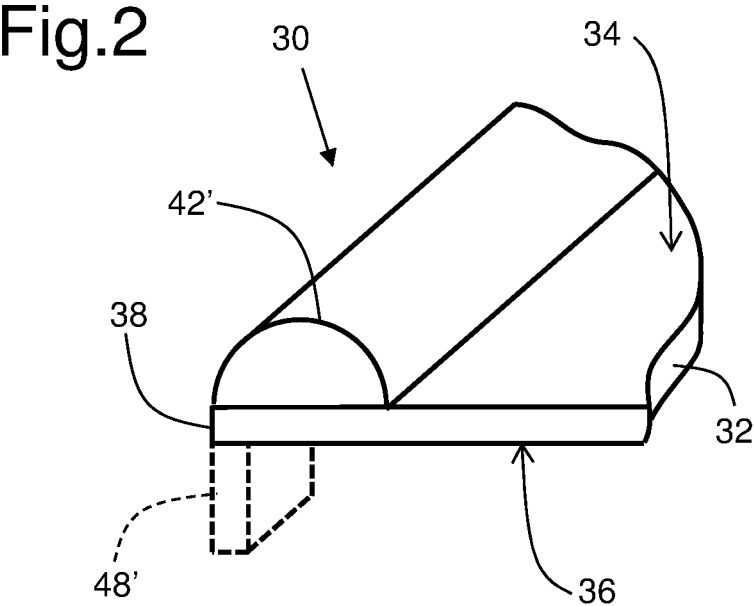
FIG. 3 is an enlarged partially broken top left perspective view of another embodiment of an accessory in accordance with the present invention.

Similarly, the elongated bar 42' could have has a generally uniform semi-circular cross-section with a generally rectilinear side laying on the top surface 34, as shown in FIG. 3.

Typically, the plate member 32, and also the depending deflector section 44, is a solid plate of generally uniform thickness, and the bottom surface 36 is generally planar. The uniform thickness typically varies between about ⅛ and about ⅜ of an inch (between about 3 and about 10 mm), depending on the material, a food-grade material, to at least provide for an acceptable heat capacity (heat preferably received from the back burner 20) such that it could remain within an acceptable temperature range required for the cooking au gratin of a foodstuff (not shown) located on the main grill 16. Such material could be, without being limited to, aluminum or preferably stainless steel.

Also, the bottom surface 36 has a high infrared emissivity such that it is capable of emitting/radiating heat stored in the plate 30.

Figure 4:
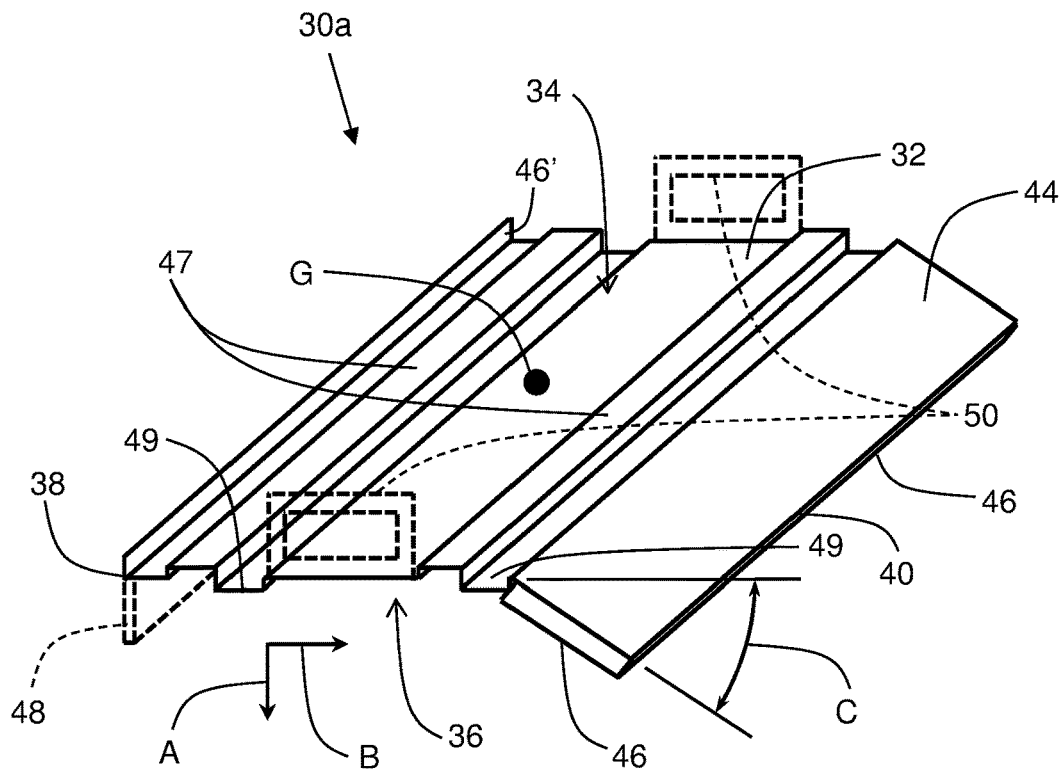
FIG. 4 is a top left perspective view of another embodiment of an accessory in accordance with the present invention, showing rigidity reinforcing longitudinal channels and bosses along the plate.

Referring now to FIG. 4, there is shown another embodiment of an accessory 30a in accordance with the present invention typically made out of stainless steel and therefore being relatively thin. In this embodiment 30a, the plate member 32 includes at least one, but typically a plurality of longitudinal (extending between the two lateral sides, in a direction substantially parallel to the first 38 and second 40 ends) bosses 47 and channels 49 formed therein, typically successive to each other, to increase the rigidity of the plate 30a.

The deflector section 44 may include at least one side flap 46, preferably one side flap on each side and one end flap, extending in the first direction A from a side edge and the second end 40 of the deflector section 44. Similarly, the plate member 32 includes at least one side flap 46' extending in the opposite direction from the first direction A and along the first end 38. The side flaps 46, 46' also help in the rigidity of the plate 30a.

Figure 5:
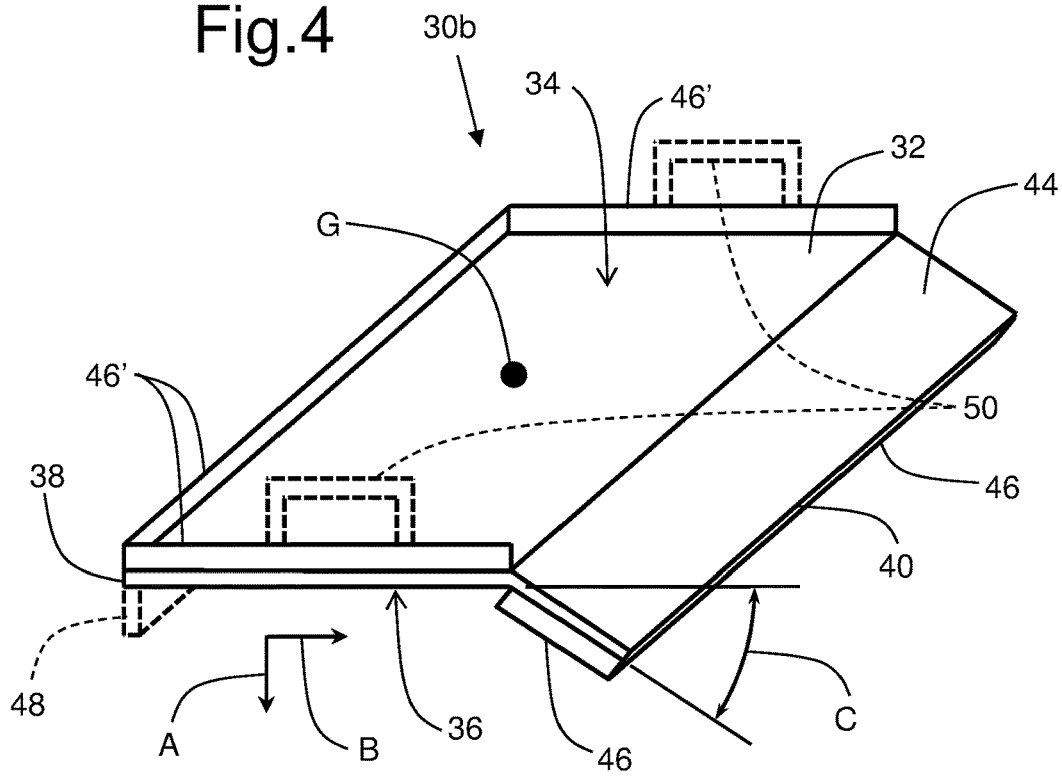
FIG. 5 is a top left perspective view of another embodiment of an accessory in accordance with the present invention, showing side flaps extending vertically at the edges of the plate member and the deflector section to increase the rigidity of the accessory.

Referring now to FIG. 5, there is shown another embodiment of an accessory 30b in accordance with the present invention typically made out of aluminum and therefore being relatively thick. In this embodiment 30b, the plate member 32 includes at least one side flap 46', preferably one side flap on each side and one end flap, extending in the opposite direction from the first direction A from a side edge and the first end 38. The side flaps 46' also help in the rigidity of the plate 30b.

Typically, some handle member 50 (shown in stippled lines in FIGS. 2, 4 and 5) could be provided to ensure an easy handling of the accessory plate 30 when required. Preferably, there would be one handle 50 on each side of the plate 30, 30a, 30b. As a person skilled in the art would readily understand, the handles 50 could widely vary in location, size and shape.

Although the accessory plate 30, 30a, 30b is intended to be used and positioned within the barbecue grill 10 when the top surface of the foodstuff, such as a cheese-topped surface, needs to be cooked au gratin, and removed therefrom when the cooking is completed, the plate 30, 30a, 30b could also be in place all the time the barbecue grill 10 is used, as it would be obvious to a person skilled in the art.

Although the present invention has been described with a certain degree of particularity, it is to be understood that the disclosure has been made by way of example only and that the present invention is not limited to the features of the embodiments described and illustrated herein, but includes all variations and modifications within the scope of the invention as hereinabove described and hereinafter claimed.

The invention claimed is:

1. An accessory positionable onto an accessory support of a barbecue grill being located above a main cooking grill of the barbecue grill having foodstuff thereon, said accessory comprising:
   a solid plate member for mounting on the accessory support and having top and bottom surfaces, the bottom surface being adapted to face the main cooking grill and the foodstuff, the solid plate member defining generally opposite first and second ends; and
   a center-of-gravity member locating a center of gravity of the accessory adjacent the first end;
   wherein the solid plate member includes at least one of a longitudinal boss and a longitudinal channel formed therein and extending in a direction generally parallel to the first and second ends, and there between; and wherein the center-of-gravity positioning member includes a weight member located adjacent the first end, the weight member is an elongated bar secured onto the top surface adjacent the first end.

2. The accessory of claim 1, further comprising a deflector section located adjacent the second end, the deflector section extending from the plate member in a first direction away from the bottom surface and opposite the top surface.

3. The accessory of claim 2, wherein the deflector section further extends from the bottom surface of the plate member in a second direction away from the first end.

4. The accessory of claim 2, wherein the deflector section is the second end extending at least partially in the first direction at a deflection angle relative to a bottom plane defined by the bottom surface.

5. The accessory of claim 4, wherein the deflection angle is typically less than about 60 degrees, and preferably less than about 45 degrees, relative to the bottom plane.

6. The accessory of claim 2, wherein the deflector section includes at least one side flap extending in the first direction from a side edge thereof.

7. The accessory of claim 1, further comprising an anchor member adapted to securely and releasably engage at least a portion of the accessory support to prevent horizontal displacement of the accessory at least in a direction toward a user of the barbecue grill.

8. The accessory of claim 7, wherein the anchor member includes a tab member extending away from the bottom surface opposite the top surface along at least a portion of an edge defining the first end.

9. The accessory of claim 1, further comprising a handle member.

10. The accessory of claim 1, wherein the bottom surface is generally planar.

11. The accessory of claim 1, wherein the solid plate member is a solid plate of generally uniform thickness.

12. The accessory of claim 11, wherein the uniform thickness varies between about ⅛ and about ⅜ of an inch (about 3 and about 10 mm).

13. The accessory of claim 1, wherein the elongated bar is positioned along a first edge of the plate member defining the first end thereof.

14. The accessory of claim 1, wherein the elongated bar has a generally uniform trapezoidal cross-section with a side laying on the top surface.

15. The accessory of claim 2, further comprising at least one flap extending from an edge of at least one of the solid plate member and the deflector section, in a direction generally away from a corresponding one of the top and bottom surfaces.

16. The accessory of claim 2, wherein the deflector section includes at least one side flap extending in the first direction from a side edge thereof.

17. The accessory of claim 1, wherein the elongated bar has a generally uniform semi-circular cross-section defining a generally rectilinear side laying on the top surface.

18. The accessory of claim 1, wherein the elongated bar has a generally solid cross-section.

\* \* \* \* \*